United States Patent
Mhetar et al.

(10) Patent No.: US 8,563,131 B2
(45) Date of Patent: *Oct. 22, 2013

(54) FLEXIBLE POLY(ARYLENE ETHER) COMPOSITION AND ARTICLES THEREOF

(75) Inventors: Vijay R. Mhetar, Slingerlands, NY (US); Vijay Rajamani, Slingerlands, NY (US)

(73) Assignee: SABIC Innovative Plastics IP B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/838,818

(22) Filed: Jul. 19, 2010

(65) Prior Publication Data

US 2010/0276180 A1    Nov. 4, 2010

Related U.S. Application Data

(63) Continuation of application No. 11/256,765, filed on Oct. 24, 2005, now Pat. No. 7,776,441.

(60) Provisional application No. 60/637,406, filed on Dec. 17, 2004.

(51) Int. Cl.
*B32B 15/00* (2006.01)
*H01B 3/30* (2006.01)

(52) U.S. Cl.
USPC ........... 428/379; 428/375; 428/372; 525/185; 174/110 R; 174/120 R (58) Field of Classification Search
None
See application file for complete search history.

(56) References Cited

U.S. PATENT DOCUMENTS

| | | | |
|---|---|---|---|
| 2,425,294 A | 8/1947 | Morgan | |
| 2,933,480 A | 4/1960 | Gresham | 526/336 |
| 3,093,621 A | 6/1963 | Gladding | 526/282 |
| 3,211,709 A | 10/1965 | Odamek et al. | 526/283 |
| 3,361,851 A | 1/1968 | Gowan | 260/897 |
| 3,646,168 A | 2/1972 | Barrett | 260/889 |
| 3,728,424 A | 4/1973 | Bauer | |

(Continued)

FOREIGN PATENT DOCUMENTS

| | | |
|---|---|---|
| EP | 0238105 | 9/1987 |
| EP | 0263678 | 4/1988 |

(Continued)

OTHER PUBLICATIONS

Japanese Patent No. JP 03231962 published May 22, 1990, abstract only.

(Continued)

*Primary Examiner* — Jill Gray
(74) *Attorney, Agent, or Firm* — Cantor Colburn LLP (57) ABSTRACT

A thermoplastic composition comprises poly(arylene ether) having an initial intrinsic viscosity greater than 0.25 dl/g as measured in chloroform at 25° C.; a polyolefin having a melt temperature greater than or equal to 120° C. and a melt flow rate of 0.3 to 15; a first block copolymer having a aryl alkylene content greater than or equal to 50 weight percent based on the total weight of the first block copolymer; a second block copolymer having an aryl alkylene content less than 50 weight percent based on the total weight of the second block copolymer; and a flame retardant, wherein the poly(arylene ether) is present in an amount greater than the amount of polyolefin. The composition is useful in the production of covered wire.

30 Claims, 4 Drawing Sheets

(56) References Cited

U.S. PATENT DOCUMENTS

| | | | | |
|---|---|---|---|---|
| 3,790,519 | A | 2/1974 | Wahlborg | 524/70 |
| 3,860,066 | A | 1/1975 | Pearce et al. | |
| 3,884,993 | A | 5/1975 | Gros | 525/211 |
| 3,894,999 | A | 7/1975 | Boozer et al. | 526/282 |
| 4,059,654 | A | 11/1977 | Von Bodungen et al. | 524/525 |
| 4,145,377 | A | 3/1979 | Bussink et al. | 524/145 |
| 4,166,055 | A | 8/1979 | Lee, Jr. | 524/141 |
| 4,173,256 | A | 11/1979 | Kilgore | |
| 4,223,736 | A | 9/1980 | Foster, Jr. | |
| 4,239,673 | A | 12/1980 | Lee, Jr. | 260/30.6 R |
| 4,242,263 | A | 12/1980 | Lee | 524/141 |
| 4,299,757 | A | 11/1981 | Kuribayashi et al. | 524/505 |
| 4,383,082 | A | 5/1983 | Lee | 525/92 D |
| 4,460,743 | A | 7/1984 | Abe et al. | 525/68 |
| 4,480,057 | A | 10/1984 | Sano | 523/206 |
| 4,522,370 | A | 6/1985 | Noack et al. | |
| 4,529,652 | A | 7/1985 | Bussink et al. | 428/379 |
| 4,584,334 | A | 4/1986 | Lee et al. | 524/151 |
| 4,713,416 | A | 12/1987 | Del Giudice et al. | 525/68 |
| 4,732,928 | A | 3/1988 | Mizushiro et al. | 524/505 |
| 4,760,118 | A | 7/1988 | White et al. | 525/397 |
| 4,764,559 | A | 8/1988 | Yamauchi et al. | 525/92 |
| 4,772,657 | A | 9/1988 | Akiyama et al. | 524/505 |
| 4,808,647 | A | 2/1989 | Abolins et al. | 524/141 |
| 4,863,997 | A | 9/1989 | Shibuya et al. | 525/92 |
| 4,892,904 | A | 1/1990 | Ting | 524/494 |
| 4,972,021 | A | 11/1990 | Lee | 525/132 |
| 5,008,332 | A | 4/1991 | Sano et al. | 525/92 D |
| 5,081,187 | A | 1/1992 | Maruyama | 525/89 |
| 5,093,422 | A | 3/1992 | Himes | 525/98 |
| 5,101,904 | A | 4/1992 | Gilbert | |
| 5,149,740 | A | 9/1992 | Maruyama et al. | |
| 5,162,433 | A | 11/1992 | Nishio et al. | 525/66 |
| 5,166,264 | A | 11/1992 | Lee et al. | 525/92 D |
| 5,191,024 | A | 3/1993 | Shibata | 525/314 |
| 5,262,480 | A | 11/1993 | Lee | 525/92 D |
| 5,283,743 | A | 2/1994 | Odagawa | |
| 5,294,655 | A | 3/1994 | Lee et al. | 524/265 |
| 5,296,540 | A | 3/1994 | Akiyama | 525/88 |
| 5,304,593 | A | 4/1994 | Nishio et al. | 524/451 |
| 5,364,898 | A | 11/1994 | Lee et al. | 524/265 |
| 5,370,813 | A | 12/1994 | DeNicola et al. | 525/68 |
| 5,397,822 | A | 3/1995 | Lee | 524/127 |
| 5,405,902 | A | 4/1995 | Nishio et al. | 525/64 |
| 5,418,291 | A | 5/1995 | Uno et al. | 525/89 |
| 5,455,292 | A | 10/1995 | Kakegawa et al. | 524/141 |
| 5,585,710 | A | 12/1996 | Nakamura et al. | |
| 5,648,424 | A | 7/1997 | Miwa et al. | 525/92 D |
| 5,705,556 | A | 1/1998 | Djiauw et al. | 524/505 |
| 6,045,635 | A | 4/2000 | Akiyama et al. | 428/35.7 |
| 6,057,401 | A | 5/2000 | Modic | 525/92 D |
| 6,214,934 | B1 | 4/2001 | Moriya et al. | 525/89 |
| 6,269,874 | B1 | 8/2001 | Rawson et al. | |
| 6,277,488 | B1 | 8/2001 | Kobe et al. | 428/354 |
| 6,300,417 | B1 | 10/2001 | Sue et al. | 525/191 |
| 6,306,978 | B1 | 10/2001 | Braat et al. | 525/397 |
| 6,322,882 | B1 | 11/2001 | Moritomi | 428/220 |
| 6,423,779 | B2 | 7/2002 | Sue et al. | 525/191 |
| 6,495,630 | B2 | 12/2002 | Adedeji | 525/89 |
| 6,509,412 | B1 | 1/2003 | Hall | 525/92 D |
| 6,548,598 | B2 | 4/2003 | Takeuchi | 525/68 |
| 6,585,836 | B2 | 7/2003 | Inagaki et al. | |
| 6,602,637 | B1 | 8/2003 | Kurasawa et al. | 429/176 |
| 6,610,422 | B1 | 8/2003 | Ooi et al. | 428/653 |
| 6,627,701 | B2 | 9/2003 | Adedeji et al. | 525/68 |
| 6,627,704 | B2* | 9/2003 | Yeager et al. | 525/391 |
| 6,646,168 | B2 | 11/2003 | Choudary et al. | |
| 6,812,276 | B2 | 11/2004 | Yeager | |
| 6,872,777 | B2 | 3/2005 | Adedeji et al. | |
| 7,084,347 | B2 | 8/2006 | Mhetar et al. | 174/110 |
| 7,217,885 | B2 | 5/2007 | Mhetar et al. | 174/110 |
| 7,217,886 | B2 | 5/2007 | Mhetar et al. | 174/110 |
| 7,220,917 | B2 | 5/2007 | Mhetar et al. | 174/110 |
| 7,332,677 | B2* | 2/2008 | Xu et al. | 174/110 R |
| 7,371,790 | B2 | 5/2008 | Yoshida et al. | |
| 7,504,585 | B2 | 3/2009 | Harada et al. | 174/110 |
| 7,517,758 | B2 | 4/2009 | Ramaswamy et al. | |
| 7,690,432 | B2 | 4/2010 | Noske et al. | |
| 7,741,564 | B2* | 6/2010 | Mhetar et al. | 174/110 R |
| 8,062,747 | B2* | 11/2011 | Harada et al. | 428/379 |
| 2001/0011118 | A1 | 8/2001 | Sanada | 525/132 |
| 2001/0018490 | A1 | 8/2001 | Mashita | 525/94 |
| 2001/0047055 | A1 | 11/2001 | Takeuchi | 525/88 |
| 2002/0112875 | A1 | 8/2002 | Hase et al. | 174/120 |
| 2003/0036602 | A1 | 2/2003 | Adedeji et al. | 525/88 |
| 2003/0168219 | A1 | 9/2003 | Sloan | |
| 2003/0176582 | A1 | 9/2003 | Bening et al. | |
| 2003/0181587 | A1 | 9/2003 | Sasagawa | 525/92 D |
| 2004/0003926 | A1 | 1/2004 | Nivens et al. | |
| 2004/0082179 | A1 | 4/2004 | Saito et al. | |
| 2004/0082719 | A1 | 4/2004 | Adedeji et al. | 525/89 |
| 2004/0096123 | A1 | 5/2004 | Shih et al. | |
| 2004/0102551 | A1 | 5/2004 | Sato et al. | 524/115 |
| 2004/0115381 | A1 | 6/2004 | Harris et al. | |
| 2004/0138371 | A1 | 7/2004 | St. Clair et al. | |
| 2004/0177993 | A1 | 9/2004 | Nagai et al. | 174/117 |
| 2004/0239735 | A1 | 12/2004 | Mashita et al. | 374/86 |
| 2006/0106139 | A1* | 5/2006 | Kosaka et al. | 524/90 |
| 2006/0131053 | A1 | 6/2006 | Kubo et al. | 174/110 |
| 2006/0134416 | A1 | 6/2006 | Kubo et al. | 482/375 |
| 2006/0135661 | A1 | 6/2006 | Mhetar et al. | |
| 2006/0135695 | A1 | 6/2006 | Guo et al. | |
| 2007/0261877 | A1 | 11/2007 | Mhetar et al. | 174/110 |
| 2007/0261878 | A1 | 11/2007 | Kosaka et al. | 174/110 |

FOREIGN PATENT DOCUMENTS

| | | |
|---|---|---|
| EP | 0274029 | 7/1988 |
| EP | 0326895 | 8/1989 |
| EP | 0358898 | 3/1990 |
| EP | 0358993 | 3/1990 |
| EP | 0362660 | 4/1990 |
| EP | 0388925 | 9/1990 |
| EP | 0467113 | 1/1992 |
| EP | 0413972 | 10/1994 |
| EP | 0719833 | 1/1997 |
| EP | 0765914 | 4/1997 |
| EP | 0639620 | 4/1999 |
| EP | 1029876 | 8/2000 |
| EP | 1148097 | 10/2001 |
| GB | 2119387 A | 11/1983 |
| WO | WO 81/02510 | 9/1981 |
| WO | WO 84/04314 | 11/1984 |
| WO | WO 87/01380 | 3/1987 |
| WO | WO 8900756 | 1/1989 |
| WO | WO 90/05759 | 5/1990 |
| WO | WO 01/092410 | 12/2001 |
| WO | WO 02/28964 | 4/2002 |
| WO | WO 03/025064 | 3/2003 |
| WO | 2004046246 A1 | 6/2004 |
| WO | WO 2004/072178 | 8/2004 |
| WO | 2006065519 A1 | 6/2006 |

OTHER PUBLICATIONS

Japanese Patent No. JP 03259941 published Nov. 20, 1991, abstract only.

Japanese Patent No. JP 04028740 published Jan. 31, 1992, abstract only.

Japanese Patent No. JP 05070679 published Mar. 23, 1993, abstract only.

Japanese Patent No. JP 05295184 published Nov. 9, 1993, abstract only.

Japanese Patent No. JP 06009828 published Jan. 18, 1994, abstract only.

Japanese Patent No. JP 06016924 published Jan. 25, 1994, abstract only.

Japanese Patent No. JP 07166026 published Jun. 27, 1995, abstract only.

Japanese Patent No. JP 06057130 published Mar. 1, 1994, abstract only.

Japanese Patent No. JP 07003083 published Jan. 6, 1995, abstract only.

(56) References Cited

OTHER PUBLICATIONS

Japanese Patent No. JP 07165998 published Jun. 27, 1995, abstract only.
Japanese Patent No. JP 07224192 published Aug. 22, 1995, abstract only.
Japanese Patent No. JP 63113047 published May 18, 1988, abstract only.
Japanese Patent No. JP 2004204223 published Jul. 22, 2004, abstract only.
Japanese Patent No. JP 3220231 published Oct. 22, 2001, manual translation.
Japanese Patent No. JP 3267146 published Mar. 18, 2002, manual translation.
Japanese Patent No. JP 3418209 published Jun. 16, 2002, manual translation.
Japanese Patent No. JP 3457042 published Oct. 14, 2003, manual translation.
Japanese Patent No. JP 07224193 published Aug. 22, 1995, machine translation.
Japanese Patent No. JP 11185532 published Jul. 9, 1999, machine translation.
Japanese Patent No. JP 2003253066 published Sep. 10, 2003, machine translation.
Japanese Patent No. JP 04085361 published Mar. 18, 1992, abstract only.
Japanese Patent No. JP 62241948 published Oct. 22, 1987, abstract only.
Japanese Patent No. JP 03152156 published Jun. 28, 1991, abstract only.
Japanese Patent No. JP 03229740 published Oct. 11, 1991, abstract only.
Japanese Patent No. JP 01204939 published Aug. 17, 1989, abstract only.
Japanese Patent No. JP 02124966 published May 14, 1990, abstract only.
Japanese Publication No. 2003226792, Published Oct. 10, 1991, Abstract Only, 1 page.
Japanese Patent Application No. 259941, Published Nov. 20, 1991, Human Translation, 29 pages.
Japanese Patent Application No. 62-241948, Published Oct. 22, 1987, Human Translation, 14 pages.
Japanese Patent Application No. S63-113047, Published May 18, 1988, Human Translation, 19 pages.
Japanese Patent Application No. 2004-204223, Published Jul. 22, 2004, Human Translation, 11 pages.
Japanese Patent No. 4-85361, Published Mar. 18, 1992, Human Translation, 7 pages.
Japanese Patent Application No. 3-152156, Published Jun. 28, 1991, Human Translation, 8 pages.
Japanese Patent Application No. H3-229740, Published Oct. 11, 1991, Human Translation, 22 pages.
Japanese Patent Application No. H1-204939, Published Aug. 17, 1989, Human Translation, 21 pages.
Japanese Patent Application No. 2-124966, Published May 14, 1990, Human Translation, 10 pages.
Japanese Patent Application No. 209534, Published Aug. 3, 1999, Human Translation, 16 pages.
Japanese Patent Application No. 7-224192, Published Aug. 22, 1995, Human Translation, 26 pages.
Japanese Patent Application No. 165998, Published Jun. 27, 1995, Human Translation, 10 pages.
Japanese Patent Application No. 7-3083, Published Jan. 1, 1995, Human Translation, 13 pages.
Japanese Patent Application No. 6-57130, Published Mar. 1, 1994, Human Translation, 24 pages.
Japanese Patent No. 7-166026, Published Jun. 27, 1995, Human Translation, 8 pages.
Japanese Patent Application No. 7-3083, Published Jan. 1, 2001, Human Translation, 13 pages.
Japanese Patent Application No. 16924, Published Jan. 1, 1994, Human Translation, 8 pages.
Japanese Patent Application No. 5295184, Published Nov. 9, 1993, Human Translation, 18 pages.
Japanese Patent Application No. H4-28740, Published Jan. 31, 1991, Human Translation, 19 pages.
Japanese Patent Application No. H3-231962, Published Oct. 15, 1991, Human Translation, 21 pages.
Japanese Patent Application No. H5-70679, Published Mar. 23, 1993, Human Translation, 15 pages.
Japanese Patent Application No. 11-189686, Published Jul. 13, 1999, Human Translation, 14 pages.
International Search Report for International Application No. PCT/US2005/042636, mailed Jul. 3, 2006, 7 pages.
Japanese Patent No. JP 50-114446 published Sep. 8, 1975, abstract only.
Japanese Patent No. JP 11147979 published Jun. 2, 1999, abstract only.
Japanese Patent No. JP 11209534 published Aug. 3, 1999, abstract only.
Japanese Patent No. JP 11189686 published Jul. 13, 1999, abstract only.
ISO 6722 "Road vehicles-60 V and 600 V single-core cables—Dimensions, test methods and requirements" 34 pages.
ASTM D790-03 "Standard Test Methods for Flexural Properties of Unreinforced and Reinforced Plastics and Electrical Insulating Materials" 11 pages.
Japanese Patent No. 02-225563; Publication Date: Sep. 7, 1990; Abstract Only; 1 Page.
Japanese Patent No. 07-150030; Publication Date: Jun. 13, 1995; Abstract Only; 1 Page.
Japanese Patent No. 07-207071; Publication Date: Aug. 8, 1995; Abstract Only; 1 Page.
Japanese Patent No. 1136504 (A); Publication Date: May 29, 1989; Abstract Only; 1 Page.
Japanese Patent No. 1189743 (A); Publication Date: Jul. 28, 1989; Abstract Only; 1 Page.
Japanese Patent No. 2001-135145; Publication Date: May 18, 2001; Abstract Only; 1 Page.
Japanese Patent No. 2002-212354; Publication Date: Jul. 31, 2002; Abstract Only; 1 Page.
Japanese Patent No. 2003-022716 (A); Publication Date Jan. 24, 2003; Abstract Only; 1 Page.
Japanese Patent No. 2004-161929; Publication Date: Jun. 10, 2004; Abstract Only; 1 Page.
Japanese Patent No. 2005113006 (A); Publication Date: Apr. 28, 2005; Abstract Only; 1 Page.
Japanese Patent No. 2005-275255 (A); Publication Date: Oct. 6, 2005; Abstract Only; 1 Page.
Japanese Patent No. 3867878 (B2); Publication Date: Jan. 17, 2007; Abstract Only; 1 Page.
German Patent No. 3917324; Publication Date: Nov. 29, 1990; Abstract Only; 1 Page.
Japanese Patent No. 7240123 (A); Publication Date: Sep. 12, 1995; Abstract Only; 1 Page.
Japanese Patent No. 9188785 (A); Publication Date: Jul. 22, 1997; Abstract Only; 1 Page.
Japanese Publication No. H7-224193; Publication Date: Aug. 22, 1995; Human Translation; 24 Pages.
Polymers: A Property Database; "Polpropylene" and "Polyethylene, High Density"; Retrieved Dec. 16, 2009; 8 Pages.

* cited by examiner

FLEXIBLE POLY(ARYLENE ETHER) COMPOSITION AND ARTICLES THEREOF

CROSS-REFERENCE TO RELATED APPLICATION

This application is a continuation of U.S. patent application Ser. No. 11/256,765 filed on Oct. 24, 2005 which claims priority to U.S. Provisional Application Ser. No. 60/637,406 filed on Dec. 17, 2004. U.S. patent application Ser. No. 11/256,765 is incorporated by reference herein in its entirety.

BACKGROUND OF INVENTION

This disclosure relates to flexible thermoplastic compositions. In particular, the disclosure relates to flexible poly(arylene ether) compositions.

Polyvinyl chloride resins have long been used as the coating resin in the covered wire and cable industry. However, there is mounting concern over the environmental impact of halogenated materials and non-halogenated alternatives are being sought. This search has met with some success in polyethylene compositions however useful polyethylene compositions typically have high levels of inorganic flame retardants that can result in deterioration of some mechanical properties and processability.

Additionally, as electronic devices become increasingly smaller and transportable there is an increasing need for the cables and wires employed as part of these devices and their accessories to be more flexible and durable. Similarly, as the number of electronic components of automotive engines increase there is an increasing need for the wires connecting the electronic components to be flexible and durable over a range of temperatures and after exposure to the various chemicals found in an automotive environment.

Accordingly, there is a need for a flexible thermoplastic composition with excellent mechanical properties and processability, which is important to the durability and cost effectiveness of covered wires and cables made using the flexible thermoplastic composition.

BRIEF DESCRIPTION OF THE INVENTION

The above described need is met by a thermoplastic composition comprising:
a poly(arylene ether) having an initial intrinsic viscosity greater than 0.25 dl/g as measured in chloroform at 25° C.;
a polyolefin having a melt temperature greater than or equal to 120° C. and a melt flow rate of 0.3 to 15;
a first block copolymer having an aryl alkylene content greater than or equal to 50 weight percent based on the total weight of the first block copolymer;
a second block copolymer having an aryl alkylene content less than 50 weight percent based on the total weight of the second block copolymer; and
a flame retardant, wherein the poly(arylene ether) is present in an amount by weight greater than the amount of polyolefin by weight.
A covered wire comprising:
a conductor; and
a covering comprising a thermoplastic composition and the thermoplastic composition comprises:
a poly(arylene ether) having an initial intrinsic viscosity greater than 0.25 dl/g as measured in chloroform at 25° C.;
a polypropylene having a melt temperature greater than or equal to 120° C. and a melt flow rate of 0.3 to 15;
a first block copolymer having an aryl alkylene content greater than or equal to 50 weight percent based on the total weight of the first block copolymer;
a second block copolymer having an aryl alkylene content less than 50 weight percent based on the total weight of the second block copolymer; and
a flame retardant agent,
wherein the poly(arylene ether) is present in an amount by weight greater than the amount by weight of polyolefin and the covered wire has sufficient flame retardance to meet or exceed the flame retardance requirement of ISO 6722 and
wherein the covering is disposed over the conductor.

DETAILED DESCRIPTION

In this specification and in the claims, which follow, reference will be made to a number of terms which shall be defined to have the following meanings.

The singular forms "a," "an," and "the" include plural referents unless the context clearly dictates otherwise.

"Optional" or "optionally" means that the subsequently described event or circumstance may or may not occur, and that the description includes instances where the event occurs and instances where it does not.

The endpoints of all ranges reciting the same characteristic are independently combinable and inclusive of the recited endpoint. Values expressed as "greater than" or "less than" are inclusive the stated endpoint, e.g., "greater than 3.5" encompasses the value of 3.5.

ISO 6722, as referred to herein, is the Dec. 15, 2002 version of this standard.

The composition described herein comprises at least two phases, a polyolefin phase and a poly(arylene ether) phase. The polyolefin phase is continuous and the poly(arylene ether) phase is dispersed in the polyolefin phase. Good compatibilization between the phases can result in improved physical properties including higher impact strength at low temperatures and room temperature, better heat aging, better flame retardance, as well as greater tensile elongation. It is generally accepted that the morphology of the composition is indicative of the degree or quality of compatibilization. Small, relatively uniformly sized particles of poly(arylene ether) evenly distributed throughout an area of the composition are indicative of good compatibilization.

The compositions described herein are essentially free of an alkenyl aromatic resin such as polystyrene or rubber-modified polystyrene (also known as high impact polystyrene or HIPS). Essentially free is defined as containing less than 10 weight percent (wt %), or, more specifically less than 7 wt %, or, more specifically less than 5 wt %, or, even more specifically less than 3 wt % of an alkenyl aromatic resin, based on the combined weight of poly(arylene ether), polyolefin and block copolymer(s). Surprisingly the presence of the alkenyl aromatic resin can negatively affect the compatibilization between the poly(arylene ether) phase and the polyolefin phase.

The composition has poly(arylene ether) particles dispersed in the continuous polyolefin phase. When the composition is injection molded or extruded, particularly when extruded to form a covered wire, the poly(arylene ether) particles may have an average diameter less than 5 micrometers or more specifically, less than or equal to 3 micrometers, or, even more specifically, less than or equal to 2 micrometers. As readily appreciated by one of ordinary skill in the art the poly(arylene ether) particles may have spherical or non-spherical shapes. The shape of the particles may be dependent upon molding or extruding conditions, particularly the amount of shear present during article formation. When the particle shape is non-spherical the diameter of the particle is defined as the longest linear dimension. This can alternately be described as the major axis.

The composition has poly(arylene ether) particles dispersed in the continuous polyolefin phase. When the composition is injection molded or extruded the poly(arylene ether) particles have an average particle area less than or equal to 4 square micrometers ($\mu m^2$), or, more specifically, less than or equal to 2 square micrometers, or, even more specifically, less than or equal to 1 square micrometer determined as described below.

The average diameter and/or particle area of the poly(arylene ether) particles in an injection molded item may be determined using transmission electron microscopy. The composition is injection molded into a disc having a 3.2 millimeters thickness as is used in an ASTM D 3763-02 test. A portion located at the center (in terms of diameter) of the disc is removed and then sections having a thickness of 100 nanometers are removed from the center (in terms of thickness) of the portion. The sections are stained in freshly prepared ruthenium tetraoxide staining solution for 30 seconds. The microscopy studies may be performed on an electron microscope such as a Technai G2. Digital image acquisition may be performed using a camera such as a Gatan Model 791 side mount camera. Images may be analyzed using image analysis software such as Clemex Vision PE to determine the average diameter or average particle area. Only particles that have boundaries completely within the viewing area are included in the analysis. The analysis and the average values are based on at least 100 particles.

The average diameter and/or particle area of the poly(arylene ether) particles in an extruded item, such as a covered wire, may be determined by removing a portion of the extruded thermoplastic and then sections having a thickness of 100 nanometers are removed from the portion at a depth of 50-60 micrometers from the surface. The sections are stained in freshly prepared ruthenium tetraoxide staining solution for 30 seconds. The microscopy studies may be performed on an electron microscope such as a Technai G2. Digital image acquisition may be performed using a camera such as a Gatan Model 791 side mount camera. Images may be analyzed using image analysis software such as Clemex Vision PE to determine the average diameter or the particle area. Only particles that have boundaries completely within the viewing area are included in the analysis. The analysis and average values are based on at least 100 particles.

Surprisingly, the intrinsic viscosity of the poly(arylene ether) and the melt flow index of the polyolefin can have an impact on the morphology of the composition. In one embodiment, the poly(arylene ether) or combination of poly(arylene ether)s has an initial intrinsic viscosity greater than 0.35 dl/g as measured in chloroform at 25° C. and the polyolefin has a melt flow rate of 0.8 to 15 grams per ten minutes when determined according to ASTM D1238. When the poly(arylene ether) or combination of poly(arylene ethers) has an initial intrinsic viscosity less than 0.35 dl/g, the composition can demonstrate decreased heat aging. When the polyolefin has a melt flow greater than or equal to 15 grams per ten minutes the composition can demonstrate reduced chemical resistance and heat aging. When the polyolefin has a melt flow less than or equal to 0.7 grams per ten minutes, the composition can have a co-continuous morphology and unacceptable mechanical properties (i.e. tensile elongation) to be used for some applications.

As suggested above the thermoplastic composition is useful in covered wire applications, particularly covered wires such as electrical wires, employed in environments where they may be exposed to chemicals, such as gasoline, diesel fuel, antifreeze, and the like, that can result in degradation. In another aspect the composition has desirable adhesion to the wire. Adhesion must be sufficient to maintain the integrity of the wire under normal use but not so strong as to prevent intentional stripping. Typically a force of about 2 to 100 Newtons, depending on the size of the conductor core and thickness of the thermoplastic coating, is employed to strip the thermoplastic coating from a wire so it is desirable that the covered wire has an adhesion strength between the conductive core and the thermoplastic composition that is less than or equal to the stripping force typically employed for the conductive core size and thermoplastic coating thickness. Exemplary stripping forces for various conductor sizes may be found in ISO 6722.

In another aspect the covered wire comprising the thermoplastic composition described herein meet or exceed the standards set forth in ISO 6722, such as flame retardance, heat aging, and abrasion, making the covered wire suitable for use in road vehicles. In particular the covered wire meets or exceeds the heat aging standards for Classes A, B or C as set forth in ISO 6722.

In another aspect the composition has a flexural modulus of 800-1800 Megapascals (MPa) as determined by ASTM D790-03 and a speed of 1.27 millimeters per minute at thickness of 3.2 millimeters. Within this range the flexural modulus may be greater than or equal to 900 MPa, or, more specifically, greater than or equal to 1200 MPa. Also within this range the flexural modulus may be less than or equal to 1700 MPa, or, more specifically, less than or equal to 1600 MPa. Flexural modulus values are the average of three samples. The samples for flexural modulus are formed using an injection pressure of 600-700 kilograms-force per square centimeter and a hold time of 15 to 20 seconds on a Plastar Ti-80G$_2$ from Toyo Machinery & Metal Co. LTD. The remaining molding conditions are shown in Table 1.

TABLE 1

| Drying temperature (° C.) | 80 |
|---|---|
| Dry time in hours | 4 |
| Cylinder temperature | |
| 1 | 240 |
| 2 | 250 |
| 3 | 260 |
| 4 | 260 |
| DH | 260 |
| Mold temperature | 80 |

As used herein, a "poly(arylene ether)" comprises a plurality of structural units of the formula (I):

(I)

wherein for each structural unit, each $Q^1$ and $Q^2$ is independently hydrogen, halogen, primary or secondary lower alkyl (e.g., an alkyl containing 1 to about 7 carbon atoms), phenyl, haloalkyl, aminoalkyl, alkenylalkyl, alkynylalkyl, hydrocarbonoxy, aryl and halohydrocarbonoxy wherein at least two carbon atoms separate the halogen and oxygen atoms. In some embodiments, each $Q^1$ is independently alkyl or phenyl, for example, $C_{1-4}$ alkyl, and each $Q^2$ is independently hydrogen or methyl. The poly(arylene ether) may comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(arylene ether) may be in the form of a homopolymer; a copolymer; a graft copolymer; an ionomer; or a block copolymer; as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units.

The poly(arylene ether) may be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

In one embodiment, the poly(arylene ether) comprises a capped poly(arylene ether). The terminal hydroxy groups may be capped with a capping agent via an acylation reaction, for example. The capping agent chosen is desirably one that results in a less reactive poly(arylene ether) thereby reducing or preventing crosslinking of the polymer chains and the formation of gels or black specks during processing at elevated temperatures. Suitable capping agents include, for example, esters of salicylic acid, anthranilic acid, or a substituted derivative thereof, and the like; esters of salicylic acid, and especially salicylic carbonate and linear polysalicylates, are preferred. As used herein, the term "ester of salicylic acid" includes compounds in which the carboxy group, the hydroxy group, or both have been esterified. Suitable salicylates include, for example, aryl salicylates such as phenyl salicylate, acetylsalicylic acid, salicylic carbonate, and polysalicylates, including both linear polysalicylates and cyclic compounds such as disalicylide and trisalicylide. The preferred capping agents are salicylic carbonate and the polysalicylates, especially linear polysalicylates. When capped, the poly(arylene ether) may be capped to any desirable extent up to 80 percent, more specifically up to about 90 percent, and even more specifically up to 100 percent of the hydroxy groups are capped. Suitable capped poly(arylene ether) and their preparation are described in U.S. Pat. No. 4,760,118 to White et al. and U.S. Pat. No. 6,306,978 to Braat et al.

Capping poly(arylene ether) with polysalicylate is also believed to reduce the amount of aminoalkyl terminated groups present in the poly(arylene ether) chain. The aminoalkyl groups are the result of oxidative coupling reactions that employ amines in the process to produce the poly(arylene ether). The aminoalkyl group, ortho to the terminal hydroxy group of the poly(arylene ether), can be susceptible to decomposition at high temperatures. The decomposition is believed to result in the regeneration of primary or secondary amine and the production of a quinone methide end group, which may in turn generate a 2,6-dialkyl-1-hydroxyphenyl end group. Capping of poly(arylene ether) containing aminoalkyl groups with polysalicylate is believed to remove such amino groups to result in a capped terminal hydroxy group of the polymer chain and the formation of 2-hydroxy-N,N-alkylbenzamine(salicylamide). The removal of the amino group and the capping provides a poly(arylene ether) that is more stable to high temperatures, thereby resulting in fewer degradative products, such as gels or black specks, during processing of the poly(arylene ether).

The poly(arylene ether) can have a number average molecular weight of about 3,000 to about 40,000 grams per mole (g/mol) and a weight average molecular weight of about 5,000 to about 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) or combination of poly(arylene ether)s can have an initial intrinsic viscosity greater than 0.25 deciliters per gram (dl/g), as measured in chloroform at 25° C. Initial intrinsic viscosity is defined as the intrinsic viscosity of the poly(arylene ether) prior to melt mixing with the other components of the composition and final intrinsic viscosity is defined as the intrinsic viscosity of the poly(arylene ether) after melt mixing with the other components of the composition. As understood by one of ordinary skill in the art the viscosity of the poly(arylene ether) may be up to 30% higher after melt mixing. The percentage of increase can be calculated by (final intrinsic viscosity−initial intrinsic viscosity)/initial intrinsic viscosity. Determining an exact ratio, when two intrinsic viscosities are used, will depend somewhat on the exact intrinsic viscosities of the poly(arylene ether) used and the ultimate physical properties that are desired.

The poly(arylene ether) may have a hydroxy end group content of less than or equal to 6300 parts per million based on the total weight of the poly(arylene ether) (ppm) as determined by Fourier Transform Infrared Spectrometry (FTIR). In one embodiment the poly(arylene ether) may have a hydroxy end group content of less than or equal to 3000 ppm, or, more specifically, less than or equal to 1500 ppm, or, even more specifically, less than or equal to 500 ppm.

The poly(arylene ether) may be substantially free of visible particulate impurities. In one embodiment, the poly(arylene ether) is substantially free of particulate impurities greater than about 15 micrometers. As used herein, the term "substantially free of visible particulate impurities" when applied to poly(arylene ether) means that a ten gram sample of a polymeric material dissolved in fifty milliliters of chloroform ($CHCl_3$) exhibits fewer than 5 visible specks when viewed in a light box. Particles visible to the naked eye are typically those greater than 40 micrometers in diameter. As used herein, the term "substantially free of particulate impurities greater than about 15 micrometers" means that of a forty gram sample of polymeric material dissolved in 400 milliliters of $CHCl_3$, the number of particulates per gram having a size of about 15 micrometers is less than 50, as measured by a Pacific Instruments ABS2 analyzer based on the average of five samples of twenty milliliter quantities of the dissolved polymeric material that is allowed to flow through the analyzer at a flow rate of one milliliter per minute (plus or minus five percent).

The composition may comprise the poly(arylene ether) in an amount of about 30 to about 65 weight percent (wt %), based on the combined weight of the poly(arylene ether), polyolefin, and block copolymers. Within this range the amount of poly(arylene ether) may be greater than or equal to about 40 wt %, or, more specifically, greater than or equal to about 45 wt %. Also within this range the amount of poly(arylene ether) may be less than or equal to about 60 wt %.

Polyolefins are of the general structure: $C_nH_{2n}$ and include polyethylene, polypropylene and polyisobutylene with exemplary homopolymers being atactic polypropylene, and isotatic polypropylene. Polyolefin resins of this general structure and methods for their preparation are well known in the art and are described for example in U.S. Pat. Nos. 2,933,480, 3,093,621, 3,211,709, 3,646,168, 3,790,519, 3,884,993, 3,894,999, 4,059,654, 4,166,055 and 4,584,334. In one embodiment the polyolefin consists essentially of a polyolefin homopolymer, or, more specifically, a crystalline polyolefin homopolymer.

Copolymers of polyolefins may also be used such copolymers of polypropylene with rubber and polyethylene with rubber. Additionally copolymers include copolymers such as ethylene octane rubber. These are sometimes referred to as impact modified polypropylene. Such copolymers are typically heterophasic and have sufficiently long sections of each component to have both amorphous and crystalline phases. Additionally the polyolefin may comprise a combination of homopolymer and copolymer, a combination of homopolymers having different melt temperatures, and/or a combination of homopolymers having a different melt flow rate.

In one embodiment the polyolefin comprises a crystalline polyolefin such as isotactic polypropylene. Crystalline polyolefins area defined as polyolefins having a crystallinity content greater than or equal to 20%, or, more specifically, greater than or equal to 25%, or, even more specifically, greater than or equal to 30%. Crystallinity may be determined by differential scanning calorimetry (DSC).

The polyolefin has a melt temperature greater than or equal to 120° C., or more specifically greater than or equal to 125° C., or, more specifically, greater than or equal to 130° C., or, even more specifically, greater than or equal to 135° C.

The polyolefin has a melt flow rate (MFR) greater than 0.3 grams per 10 minutes and less than or equal to 15 grams per ten minutes (g/10 min). Within this range the melt flow rate may be greater than or equal to 0.5 g/10 min or more specifically greater than or equal to 0.7 g/10 min. Also within this range the melt flow rate may be less than or equal to 10, or, more specifically, less than or equal to 6, or, more specifically, less than or equal to 5 g/10 min. Melt flow rate can be determined according to ASTM D1238 using either powdered or pelletized polyolefin, a load of 2.16 kilograms and a temperature suitable for the resin (190° C. for ethylene based resins and 230° C. for propylene based resins).

The composition may comprise the polyolefin in an amount of 20 to 40 weight percent (wt %), based on the combined weight of the poly(arylene ether), polyolefin, and block copolymers. Within this range the amount of polyolefin may be greater than or equal to 23 wt %, or, more specifically, greater than or equal to about 25 wt %. Also within this range the amount of polyolefin may be less than or equal to about 35 wt %, or, more specifically, less than or equal to about 33 wt %.

Figure 1:
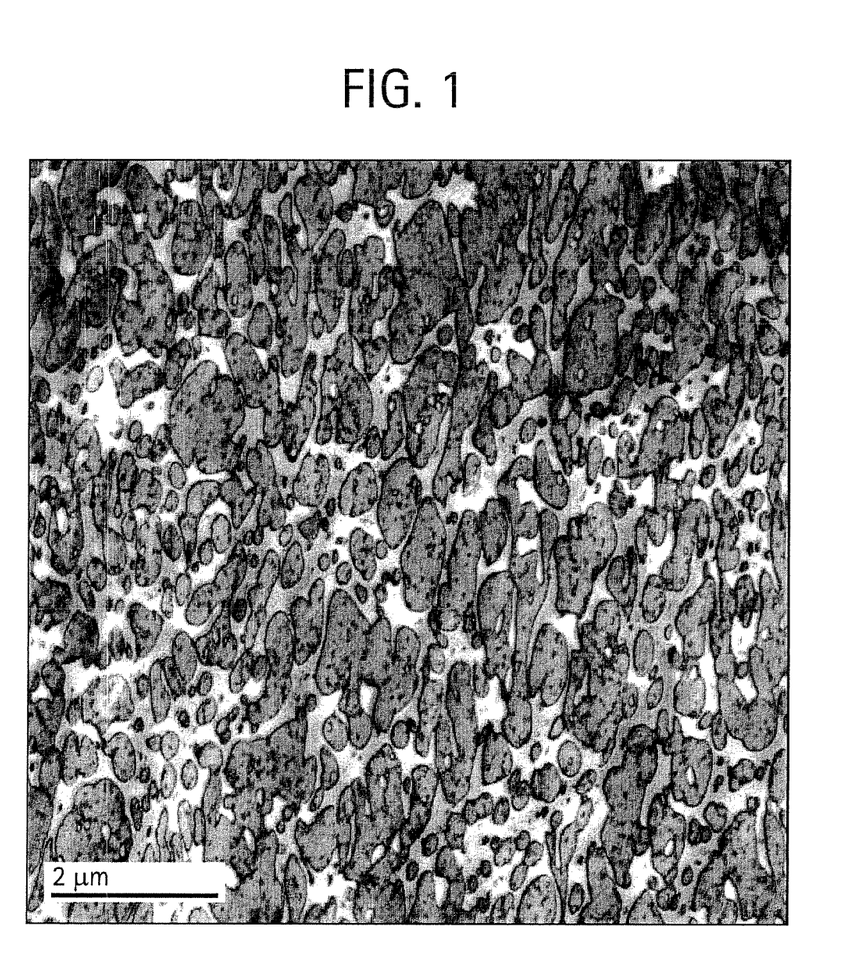
FIGS. 1-4 are transmission electron micrographs of thermoplastic compositions described herein.

The block copolymers are copolymers comprising (A) at least one block comprising repeating aryl alkylene units and (B) at least one block comprising repeating alkylene units. The arrangement of blocks (A) and (B) may be a linear structure or a so-called radial teleblock structure having branched chains. A-B diblock copolymers and A-B-A triblock copolymers have one or two blocks A comprising repeating aryl alkylene units. The pendant aryl moiety may be polycyclic and may have a substituent at any available position on the cyclic portion. Suitable substituents include alkyl groups having 1 to 4 carbons. An exemplary aryl alkylene unit is phenylethylene, which is shown in FIG. 1:

(I)

Block A may further comprise alkylene units having 2 to 15 carbons as long as the quantity of aryl alkylene units exceeds the quantity of alkylene units. Block B comprises repeating alkylene units having 2 to 15 carbons such as ethylene, propylene, butylene or combinations of two or more of the foregoing. Block B may further comprise aryl alkylene units as long as the quantity of alkylene units exceeds the quantity of aryl alkylene units. Each occurrence of block A may have a molecular weight which is the same or different than other occurrences of block A. Similarly each occurrence of block B may have a molecular weight which is the same or different than other occurrences of block B.

The repeating aryl alkylene units result from the polymerization of aryl alkylene monomers such as styrene. The repeating alkylene units result from the hydrogenation of repeating unsaturated units such as butadiene. The butadiene may comprise 1,4-butadiene and/or 1,2-butadiene. The B block may further comprise some unsaturated carbon-carbon bonds.

Exemplary block copolymers include polyphenylethylene-poly(ethylene/propylene) which is sometimes referred to as polystyrene-poly(ethylene/propylene), polyphenylethylene-poly(ethylene/propylene)-polyphenylethylene (sometimes referred to as polystyrene-poly(ethylene/propylene)-polystyrene) and polyphenylethylene-poly(ethylene/butylene)-polyphenylethylene (sometimes referred to as polystyrene-poly(ethylene/butylene)-polystyrene).

The first block copolymer has an aryl alkylene content greater than or to equal to 50 weight percent based on the total weight of the first block copolymer. The second block copolymer has an aryl alkylene content less than 50 weight percent based on the total weight of the second block copolymer. The first block copolymer, second block copolymer or both the first and second block copolymers may be a blend of diblock and triblock copolymers. An exemplary combination of block copolymers is a polyphenylethylene-poly(ethylene/butylene)-polyphenylethylene having a phenylethylene content of 15 weight percent to 40 weight percent, based on the total weight of the block copolymer and a polyphenylethylene-poly(ethylene-butylene)-polyphenylethylene having a phenylethylene content of 55 weight percent to 70 weight percent, based on the total weight of the block copolymer may be used. Exemplary block copolymers having an aryl alkylene content greater than 50 wt % are commercially available from Asahi under the trademark TUFTEC and have grade names such as H1043, as well as some grades available under the tradename SEPTON from Kuraray. Exemplary block copolymers having an aryl alkylene content less than 50 wt % are commercially available from Kraton Polymers under the trademark KRATON and have grade names such as G-1701, G-1702, G-1730, G-1641, G-1650, G-1651, G-1652, G-1657, A-RP6936 and A-RP6935.

In one embodiment the first and second block copolymers are both triblock copolymers.

In some embodiments the block copolymer(s) have a number average molecular weight of 5,000 to 1,000,000 grams per mole (g/mol), as determined by gel permeation chromatography (GPC) using polystyrene standards. Within this range, the number average molecular weight may be at least 10,000 g/mol, or, more specifically, at least 30,000 g/mol, or, even more specifically, at least 45,000 g/mol. Also within this range, the number average molecular weight may preferably be up to 800,000 g/mol, or, more specifically, up to 700,000 g/mol, or, even more specifically, up to 650,000 g/mol.

The combination of block copolymers is present in an amount sufficient to result in the formation of dispersed poly(arylene ether) particles having an average diameter less than 5 micrometers and/or an average particle area less than or equal to 4 square micrometers ($\mu m^2$). The combination of block copolymers may be present in the composition in an amount of 2 to 20 weight percent, based on the combined weight of the poly(arylene ether), polyolefin and block copolymers. Within this range the combination of block copolymers may be present in an amount greater than or equal to 6, or, more specifically, greater than or equal to 8 weight percent based on the combined weight of the poly(arylene ether), polyolefin and block copolymers. Also within this range the combination of block copolymers may be present in an amount less than or equal to 15, or, more specifically, less than or equal to 13, or, even more specifically, less than or equal to 12 weight percent based on the combined weight of the poly(arylene ether), polyolefin, and block copolymers. In one embodiment the ratio of the first block copolymer to the second block copolymer is 0.3 to 3.0.

There is no particular restriction on the types of flame retardants that may be used except that the flame retardant is suitably stable at the elevated temperatures employed during processing and free of chlorine and bromine Exemplary flame retardants include melamine (CAS No. 108-78-1), melamine cyanurate (CAS No. 37640-57-6), melamine phosphate (CAS No. 20208-95-1), melamine pyrophosphate (CAS No. 15541-60-3), melamine polyphosphate (CAS#218768-84-4), melam, melem, melon, zinc borate (CAS No. 1332-07-6), boron phosphate, red phosphorous (CAS No. 7723-14-0), organophosphate esters, monoammonium phosphate (CAS No. 7722-76-1), diammonium phosphate (CAS No. 7783-28-0), alkyl phosphonates (CAS No. 78-38-6 and 78-40-0), metal dialkyl phosphinate, ammonium polyphosphates (CAS No. 68333-79-9), low melting glasses and combinations of two or more of the foregoing flame retardants.

Exemplary organophosphate ester flame retardants include, but are not limited to, phosphate esters comprising phenyl groups, substituted phenyl groups, or a combination of phenyl groups and substituted phenyl groups, bis-aryl phosphate esters based upon resorcinol such as, for example, resorcinol bis-diphenylphosphate, as well as those based upon bis-phenols such as, for example, bis-phenol A bis-diphenylphosphate. In one embodiment, the organophosphate ester is selected from tris(alkylphenyl) phosphate (for example, CAS No. 89492-23-9 or CAS No. 78-33-1), resorcinol bis-diphenylphosphate (for example, CAS No. 57583-54-7), bis-phenol A bis-diphenylphosphate (for example, CAS No. 181028-79-5), triphenyl phosphate (for example, CAS No. 115-86-6), tris(isopropylphenyl) phosphate (for example, CAS No. 68937-41-7) and mixtures of two or more of the foregoing organophosphate esters.

In one embodiment the organophosphate ester comprises a bis-aryl phosphate of Formula III:

(III)

wherein R, $R^5$ and $R^6$ are independently at each occurrence an alkyl group having 1 to carbons and $R^1$-$R^4$ are independently an alkyl, aryl, arylalkyl or alkylaryl group having 1 to 10 carbons; n is an integer equal to 1 to 25; and s1 and s2 are independently an integer equal to 0 to 2. In some embodiments $OR^1$, $OR^2$, $OR^3$ and $OR^4$ are independently derived from phenol, a monoalkylphenol, a dialkylphenol or a trialkylphenol.

As readily appreciated by one of ordinary skill in the art, the bis-aryl phosphate is derived from a bisphenol. Exemplary bisphenols include 2,2-bis(4-hydroxyphenyl)propane (so-called bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. In one embodiment, the bisphenol comprises bisphenol A.

Organophosphate esters can have differing molecular weights making the determination of the amount of different organophosphate esters used in the thermoplastic composition difficult. In one embodiment the amount of phosphorus, as the result of the organophosphate ester, is 0.8 weight percent to 1.2 weight percent with respect to the total weight of the composition.

The amount of the flame retardant, when present in the thermoplastic composition, is sufficient for the covered conductor to pass the relevant flame retardance standard to the type of covered conductor. For example, when the covered conductor is an covered wire the amount of flame retardant is sufficient for the covered wire to have a flame out time less than or equal to 70 seconds, when tested according to the flame propagation procedure contained in ISO 6722.

In one embodiment, the flame retardant comprises an organophosphate ester present in an amount of 5 to 18 weight percent (wt. %), with respect to the total weight of the composition. Within this range the amount of organophosphate ester can be greater than or equal to 7 wt. %, or more specifically, greater than or equal to 9 wt. %. Also within this range the amount of organophosphate ester can be less than or equal to 16 wt. %, or, more specifically, less than or equal to 14 wt. %.

In one embodiment the composition is contains less than 0.1 weight percent polysiloxane, or, more specifically, less than 0.05 weight percent polysiloxane.

Additionally, the composition may optionally also contain various additives, such as antioxidants; fillers and reinforcing agents having an average particle size less than or equal to 10 micrometers, such as, for example, silicates, $TiO_2$, fibers, glass fibers, glass spheres, calcium carbonate, talc, and mica; mold release agents; UV absorbers; stabilizers such as light stabilizers and others; lubricants; plasticizers; pigments; dyes; colorants; anti-static agents; foaming agents; blowing agents; metal deactivators, and combinations comprising one or more of the foregoing additives.

In one embodiment the thermoplastic composition consists essentially of poly(arylene ether) having an initial intrinsic viscosity greater than 0.35 dl/g, as measured in chloroform at 25° C.; a polyolefin having a melt temperature greater than or equal to 125° C. and a melt flow rate of 0.8 to 15; a fire retardant and a combination of two block copolymers having different aryl alkylene contents wherein a first block copolymer has an aryl alkylene content greater than or equal to 50 weight percent based on the total weight of the first block copolymer and a second block copolymer has an aryl alkylene content less than 50 weight percent based on the total weight of the second block copolymer. As used herein "consists essentially of" permits the inclusion of additives as described herein but excludes additional polymeric resins such as polystyrene, polyamide, polyetherimide, polycarbonate, polysiloxane and the like.

A method for making the thermoplastic composition comprises melt mixing (compounding) the components, typically in a melt mixing device such as an compounding extruder or Banbury mixer. In one embodiment, the poly(arylene ether), block copolymers, and polyolefin are simultaneously melt mixed. In another embodiment, the poly(arylene ether), block copolymers, and optionally a portion of the polyolefin are melt mixed to form a first melt mixture. Subsequently, the polyolefin or remainder of the polyolefin is further melt mixed with the first melt mixture to form a second melt mixture. Alternatively, the poly(arylene ether) and a portion of the block copolymers may be melt mixed to form a first melt mixture and then the polyolefin and the remainder of the block copolymers are further melt mixed with the first melt mixture to form a second melt mixture.

The aforementioned melt mixing processes can be achieved without isolating the first melt mixture or can be achieved by isolating the first melt mixture. One or more melt mixing devices including one or more types of melt mixing devices can be used in these processes. In one embodiment, some components of the thermoplastic composition that forms the covering may be introduced and melt mixed in an extruder used to coat the conductor.

In one embodiment, the poly(arylene ether) and the block copolymer having an aryl alkylene content greater than or equal to 50 weight percent can be melt mixed to form a first melt mixture and the polyolefin and a block copolymer having an aryl alkylene content less than 50 weight percent can be compounded with the first melt mixture to form a second melt mixture.

The method and location of the addition of the flame retardant is typically dictated by the identity and physical properties, e.g., solid or liquid, of the flame retardant as well understood in the general art of polymer alloys and their manufacture. In one embodiment, the flame retardant is combined with one of the components of the thermoplastic composition, e.g., a portion of the polyolefin, to form a concentrate that is subsequently melt mixed with the remaining components.

The poly(arylene ether), block copolymers, polyolefin and flame retardant are melt mixed at a temperature greater than or equal to the glass transition temperature of the poly (arylene ether) but less than the degradation temperature of the polyolefin. For example, the poly(arylene ether), block copolymers, polyolefin and flame retardant may be melt mixed at an extruder temperature of 240° C. to 320° C., although brief periods in excess of this range may occur during melt mixing. Within this range, the temperature may be greater than or equal to 250° C., or, more specifically, greater than or equal to 260° C. Also within this range the temperature may be less than or equal to 310° C., or, more specifically, less than or equal to 300° C.

After some or all the components are melt mixed, the molten mixture can be melt filtered through one of more filters. In one embodiment the one or more filters have openings with diameters of 20 micrometers to 150 micrometers. Within this range, the openings may have diameters less than or equal to 130 micrometers, or, more specifically, less than or equal to 110 micrometers. Also within this range the openings can have diameters greater than or equal to 30 micrometers, or, more specifically, greater than or equal to 40 micrometers.

In one embodiment, the filter openings have a maximum diameter that is less than or equal to half of the thickness of the covering that will be applied to the conductor. For example, if the covered conductor has a covering with a thickness of 200 micrometers, the filter openings have a maximum diameter less than or equal to 100 micrometers.

Any suitable melt filtration system or device that can remove particulate impurities from the molten mixture may be used. In one embodiment the melt is filtered through a single melt filtration system. Multiple melt filtration systems are also contemplated.

Suitable melt filtration systems include filters made from a variety of materials such as, but not limited to, sintered-metal, metal mesh or screen, fiber metal felt, ceramic, or a combination of the foregoing materials, and the like. Particularly useful filters are sintered metal filters exhibiting high tortuosity, including the sintered wire mesh filters prepared by Pall Corporation and Martin Kurz & Company, Inc.

In one embodiment the melt filtered mixture is passed through a die head and pelletized by either strand pelletization or underwater pelletization. The pelletized material may be packaged, stored and transported. In one embodiment the pellets are packaged into metal foil lined plastic bags, typically polypropylene bags, or metal foil lined paper bags. Substantially all of the air can be evacuated from the pellet filled bags.

In one embodiment, the thermoplastic composition is substantially free of visible particulate impurities. Visible particulates or "black specks" are dark or colored particulates generally visible to the human eye without magnification and having an average diameter of 40 micrometers or greater. Although some people are able to without magnification visually detect particles having an average diameter smaller than 30 micrometers and other people can detect only particles having an average diameter larger than 40 micrometers, the terms "visible particles," "visible particulates," and "black specks" when used herein without reference to a specified average diameter means those particulates having an average diameter of 40 micrometers or greater. As used herein, the term "substantially free of visible particulate impurities" when applied to the thermoplastic composition means that when the composition is injection molded to form 5 plaques having dimensions of 75 millimeters×50 millimeters and having a thickness of 3 millimeters and the plaques are visually inspected for black specks with the naked eye the total number of black specks for all five plaques is less than or equal to 100, or, more specifically, less than or equal to 70, or, even more specifically, less than or equal to 50.

In one embodiment the pellets are melted and the composition applied to the conductor by a suitable method such as extrusion coating to form an covered wire. For example, a coating extruder equipped with a screw, crosshead, breaker plate, distributor, nipple, and die can be used. The melted thermoplastic composition forms a covering disposed over a circumference of the conductor. Extrusion coating may employ a single taper die, a double taper die, other appropriate die or combination of dies to position the conductor centrally and avoid die lip build up.

In one embodiment, the composition is applied to the conductor to form a covering disposed over the conductor. Additional layers may be applied to the covering.

In one embodiment the composition is applied to a conductor having one or more intervening layers between the conductor and the covering to form a covering disposed over the conductor. For instance, an optional adhesion promoting layer may be disposed between the conductor and covering. In another example the conductor may be coated with a metal deactivator prior to applying the covering. In another example the intervening layer comprises a thermoplastic or thermoset composition that, in some cases, is foamed.

The conductor may comprise a single strand or a plurality of strands. In some cases, a plurality of strands may be bundled, twisted, or braided to form a conductor. Additionally, the conductor may have various shapes such as round or oblong. The conductor may be any type of conductor used to transmit a signal. Exemplary signals include optical, electrical, and electromagnetic. Glass fibers are one example of an optical conductor. Suitable electrical conductors include, but are not limited to, copper, aluminum, lead, and alloys comprising one or more of the foregoing metals.

The cross-sectional area of the conductor and thickness of the covering may vary and is typically determined by the end use of the covered conductor. In one embodiment the covered conductor is an covered wire and the covered wire can be used as electric wire without limitation, including, for example, for harness wire for automobiles, wire for household electrical appliances, wire for electric power, wire for instruments, wire for information communication, wire for electric cars, as well as ships, airplanes, and the like. In one embodiment the covered conductor is an optical cable and can be used in interior applications (inside a building), exterior applications (outside a building) or both interior and exterior applications. Exemplary applications include data transmission networks and voice transmission networks such as telephone networks and local area networks (LAN).

In one embodiment the conductor has a cross sectional area of 0.10 square millimeters to 4.5 square millimeters and the covering has a thickness of 0.15 millimeters to 1.0 millimeters.

In some embodiments it may be useful to dry the thermoplastic composition before extrusion coating. Exemplary drying conditions are 60-90° C. for 2-20 hours. Additionally, in one embodiment, during extrusion coating, the thermoplastic composition is melt filtered, prior to formation of the coating, through one or more filters having opening diameters of 20 micrometers to 150 micrometers. Within this range, the openings diameters may be greater than or equal to 30 micrometers, or more specifically greater than or equal to 40 micrometers. Also within this range the openings diameters may be less than or equal to 130 micrometers, or, more specifically, less than or equal to 110 micrometers. The coating extruder may comprise one or more filters as described above.

In one embodiment, during extrusion coating, the thermoplastic composition is melt filtered, prior to formation of the coating, through one or more filters having opening diameters wherein the filter openings have a maximum diameter that is less than or equal to half of the thickness of the covering that will be applied to the conductor.

In another embodiment the melt filtered mixture produced by melt mixing is not pelletized. Rather the molten melt filtered mixture is formed directly into a coating for the conductor using a coating extruder that is in tandem with the melt mixing apparatus, typically a compounding extruder. The coating extruder may comprise one or more filters as described above.

It is contemplated that in some embodiments the thermoplastic composition may be extruded or otherwise formed into a tube that will provide a covering. The conductor and optional intervening layer may be inserted into the tube to form the covered conductor.

A color concentrate or masterbatch may be added to the composition prior to or during the extrusion coating. When a color concentrate is used it is typically present in an amount less than or equal to 3 weight percent, based on the total weight of the composition. In one embodiment dye and/or pigment employed in the color concentrate is free of chlorine, bromine, and fluorine. As appreciated by one of skill in the art, the color of the composition prior to the addition of color concentrate may impact the final color achieved and in some cases it may be advantageous to employ a bleaching agent and/or color stabilization agents. Bleaching agents and color stabilization agents are known in the art and are commercially available.

The extruder temperature during extrusion coating is generally less than or equal to 320° C., or, more specifically, less than or equal to 310° C., or, more specifically, less than or equal to 290° C. Additionally the processing temperature is adjusted to provide a sufficiently fluid molten composition to afford a covering for the conductor, for example, higher than the melting point of the thermoplastic composition, or more specifically at least 10° C. higher than the melting point of the thermoplastic composition.

After extrusion coating the covered conductor is usually cooled using a water bath, water spray, air jets, or a combination comprising one or more of the foregoing cooling methods. Exemplary water bath temperatures are 20 to 85° C.

Figure 5:
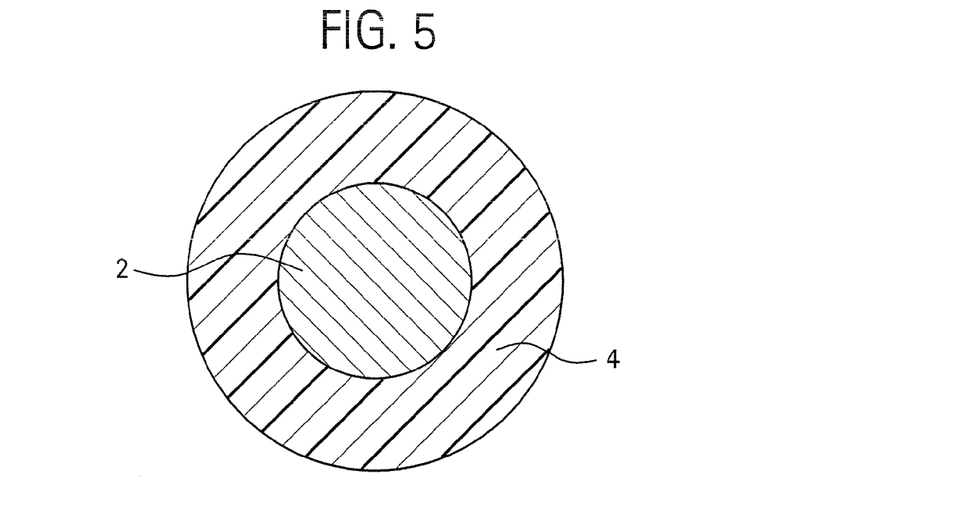
FIG. 5 is a cross sectioned view of a covered conduction.
Figure 6:
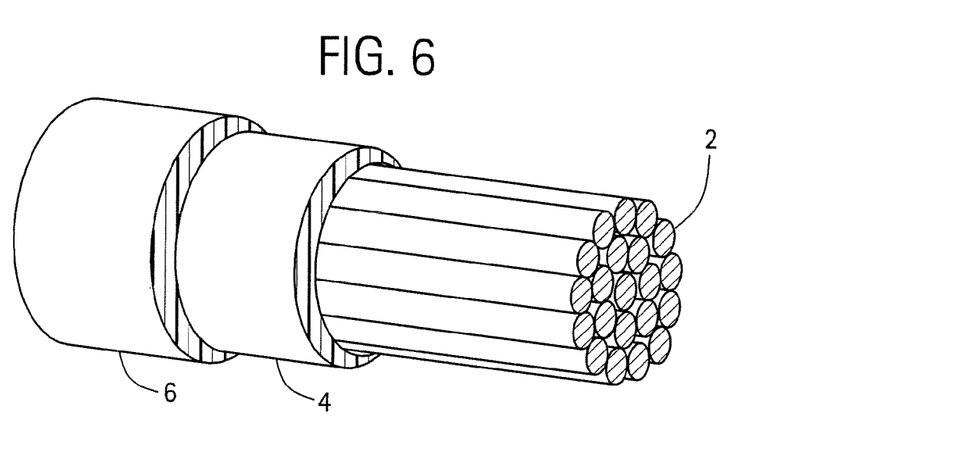
FIGS. 6 and 7 are perspective views of covered conductors.
Figure 7:
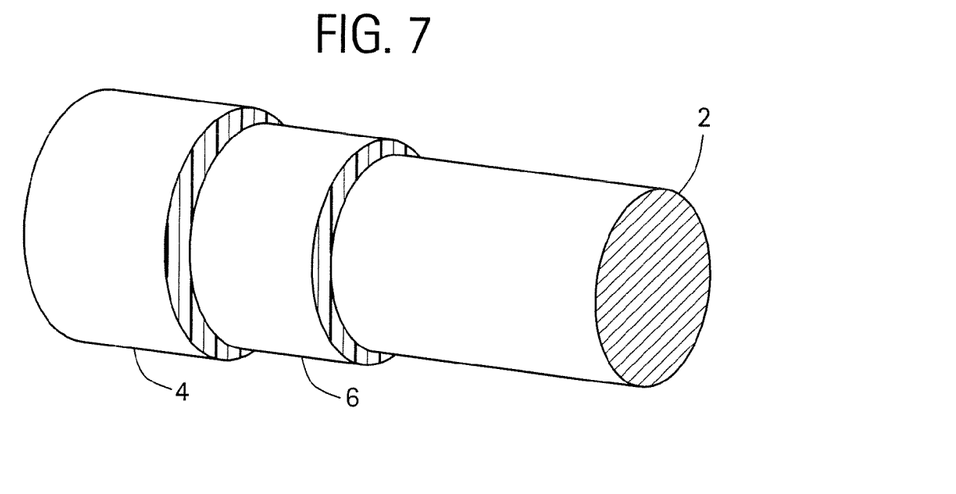

A cross-section of an exemplary covered conductor is seen in FIG. 5. FIG. 5 shows a covering, 4, disposed over a conductor, 2. In one embodiment, the covering, 4, comprises a foamed thermoplastic composition. Perspective views of exemplary covered conductors are shown in FIGS. 6 and 7. FIG. 6 shows a covering, 4, disposed over a conductor, 2, comprising a plurality of strands and an optional additional layer, 6, disposed over the covering, 4, and the conductor, 2. In one embodiment, the covering, 4, comprises a foamed thermoplastic composition. Conductor, 2, can also comprise a unitary conductor. FIG. 7 shows a covering, 4, disposed over a unitary conductor, 2, and an intervening layer, 6. In one embodiment, the intervening layer, 6, comprises a foamed composition. Conductor, 2, can also comprise a plurality of strands.

Alternatively the composition may be molded or extruded to form articles such as sheets or trays when it is desirable for such articles to have combination of chemical resistance, heat aging, abrasion resistance and impact strength.

Exemplary covered conductors include all types of electrical wire such as the cable used to connect vehicle and a trailer wires used in medical equipment building wire, external wire and the like.

In addition to covered conductors the thermoplastic composition may be useful in air craft wire guides, aircraft flooring, flexible tubing, particularly in the medical field.

The composition and covered wire are further illustrated by the following non-limiting examples.

EXAMPLES

The following examples were prepared using the materials listed in Table 1.

TABLE 1

| Component | Description |
|---|---|
| PPE-0.33 IV | A poly(2,6-dimethylphenylene ether) having an intrinsic viscosity of 0.33 dl/g as measured in chloroform at 25° C. and commercially available from General Electric. |
| PPE-0.46 IV | A poly(2,6-dimethylphenylene ether) with an intrinsic viscosity of 0.46 dl/g as measured in chloroform at 25° C. commercially available from General Electric |
| KG1650 | A polyphenylethylene-poly(ethylene/butylene)-polyphenylethylene block copolymer having a phenylethylene content of 32 weight percent, based on the total weight of the block copolymer and commercially available from Kraton Polymers. |
| PP | A polypropylene having a melt flow rate of 1.5 g/10 min determined according to ASTM D1238 as described above and commercially available from Sunoco Chemicals under the tradename D-015-C2. |
| Tuftec H1043 | A polyphenylethylene-poly(ethylene/butylene)-polyphenylethylene block copolymer having a phenylethylene content of 67 weight percent, based on the total weight of the block copolymer and commercially available from Asahi Chemical |
| BPADP | Tetraphenyl bisphenol A diphosphate (CAS 181028-79-5) |

Examples 1-15

Figure 2:
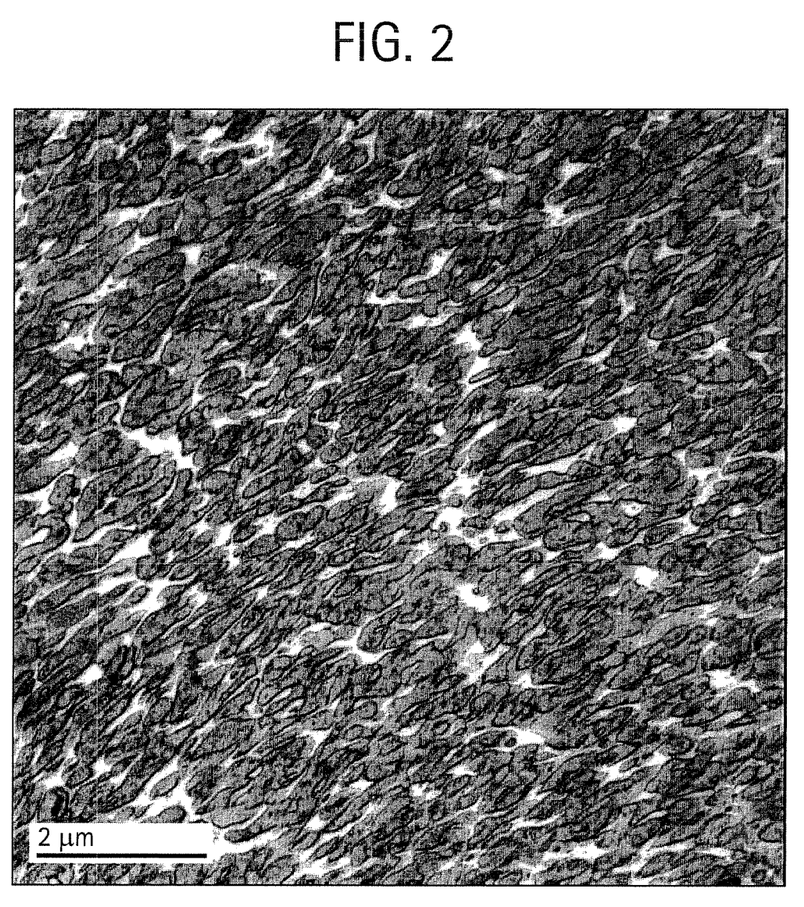
Figure 3:
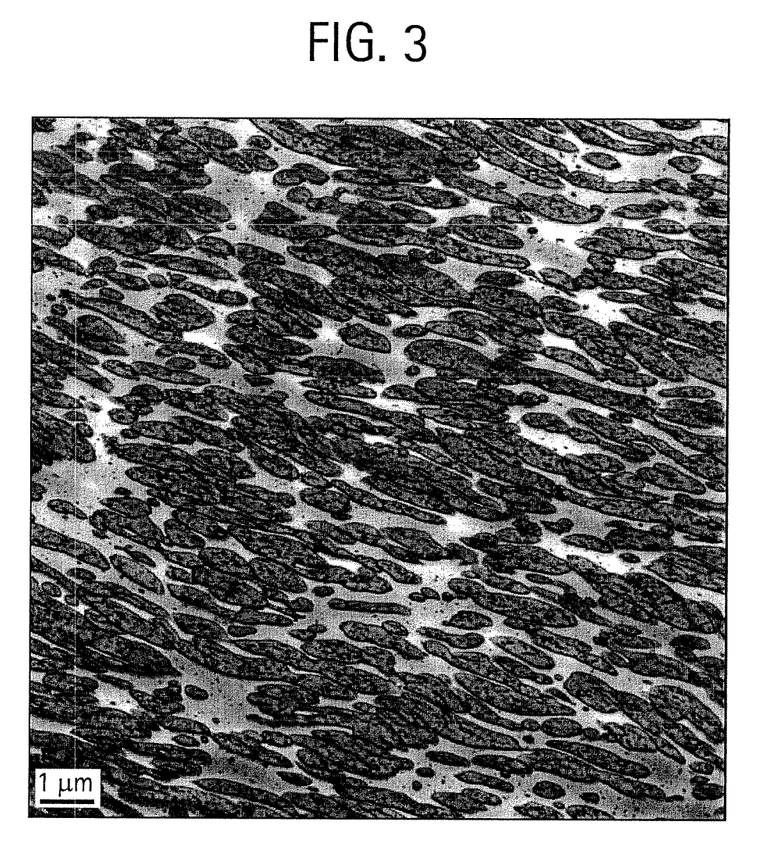
Figure 4:
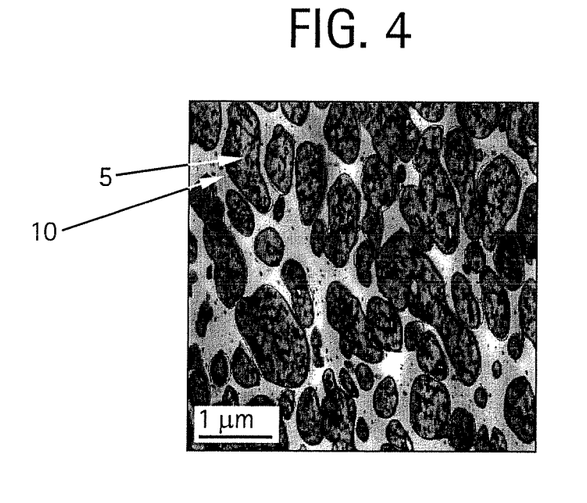

Examples 1-15 were made by combining the components in an twin screw extruder. The PPE and block copolymers were added at the feedthroat and the PP was added downstream. The BPADP, when present, was added by a liquid injector in the second half of the extruder. The extruded material was injected molded into test specimens for physical property testing. The physical properties and their test methods are listed in Table 2. Testing according to ASTM D638-03 employed Type I samples injection molded using the same conditions as flexural modulus samples. Tensile elongation was measured at a speed of 50 millimeters per minute. Megapascals are abbreviated as MPa, Joules are abbreviated as J, Newtons are abbreviated as N, and meters are abbreviated as m. The compositions of the Examples are listed in Table 3. The data is listed in Table 4. The deflection temperature and flexural modulus values are an average of 3 samples. The remaining values are an average of 5 samples. A transmission electron micrograph of the morphology of an injection molded sample of Example 15 is shown in FIG. 1. A transmission electron micrograph of the morphology of the thermoplastic coating of an extruded covered wire having the composition of Example 15 is shown in FIG. 2. A transmission electron micrograph of the morphology of an injection molded sample of Example 5 is shown in FIG. 3. FIG. 4 is a transmission electron micrograph of Example 5 showing the particles (5) with the boundaries (10) marked in preparation for determination of average diameter and particle area. Example 5 had an average diameter of 0.96 micrometers and an average particle area of 0.32 square micrometers. The average values were determined based on 129 particles.

TABLE 2

| Physical Property | Units | Test Method |
|---|---|---|
| Elongation at Yield-Avg | % | ASTM D638-03 |
| Elongation at Break-Avg | % | ASTM D638-03 |
| Stress at Break-Avg | MPa | ASTM D638-03 |
| Stress at Yield-Avg | MPa | ASTM D638-03 |
| Modulus of Elasticity | MPa | ASTM D638-03 |
| Deflection temp-Avg | °C. | ASTM D648-04 |
| Energy to failure-23 C Avg | J | ASTM D3763-02 |
| Energy to max load-23 C Avg | J | ASTM D3763-02 |
| Max Load-Avg | N | ASTMD3763-02 |
| Energy to max load -30 C | J | ASTM D3763-02 |
| Energy to failure -30 C | J | ASTM D3763-02 |
| Max Load -30 C | N | ASTM D3763-02 |
| Impact Strength Avg | J/m | ASTM D256-03 |
| Flexural Modulus Avg | MPa | ASTM D790-03 |

TABLE 3

| Component | 1* | 2* | 3* | 4 | 5 | 6 | 7 | 8 | 9 | 10* | 11* | 12* | 13 | 14 | 15 |
|---|---|---|---|---|---|---|---|---|---|---|---|---|---|---|---|
| PPE-0.33 IV | — | — | — | — | — | — | — | — | — | 50 | 50 | 50 | 50 | — | — |
| PPE-0.46 IV | 50 | 50 | 50 | 50 | 50 | 50 | 50 | 50 | — | — | — | — | — | 49 | 52 |
| PP PD 403 | 40 | 40 | 40 | 40 | 40 | 40 | 40 | 40 | 40 | 40 | 40 | 40 | 40 | 34 | 29 |
| KG1650 | 10 | — | — | 5 | — | 7.5 | 2.5 | — | — | 10 | — | — | 5 | 5 | 5 |
| Tuftec H1043 | — | 10 | — | 5 | 5 | 2.5 | 7.5 | 7.5 | 5 | — | 10 | — | 5 | 5 | 5 |
| KG1701 | — | — | 10 | — | 5 | — | — | 2.5 | — | — | — | 10 | — | — | — |
| BPADP | — | — | — | — | — | — | — | — | — | — | — | — | — | 7 | 9 |

*Comparative examples

TABLE 4

| Property | 1* | 2* | 3* | 4 | 5 | 6 | 7 | 8 |
|---|---|---|---|---|---|---|---|---|
| Elongation at Yield-Avg | 8 | 8 | 4 | 9 | 8 | 23 | 14 | 13 |
| Elongation at Break-Avg | 59 | 98 | 4.0 | 100 | 22 | 108 | 99 | 71 |
| Stress at Break-Avg | 32.3 | 38.4 | 19.8 | 36.7 | 35.6 | 35.7 | 37.2 | 35.7 |
| Stress at Yield-Avg | 35.5 | 43.5 | 19.9 | 40.1 | 37.3 | 37.3 | 42.2 | 42.5 |
| Modulus of Elasticity | 2906 | 4118 | 1136 | 2762 | 3330 | 1309 | 1764 | 1842 |
| Deflection temp-Avg | 151 | 148 | 80 | 140 | 146 | 134 | 146 | 145 |
| Energy to failure-23 C Avg | 25.2 | 40.1 | 29.2 | 37.8 | 36.0 | 37.1 | 42.0 | 41.2 |
| Energy to max load-23 C Avg | 23.5 | 28.2 | 24.8 | 27.8 | 27.0 | 29.6 | 31.3 | 29.5 |
| Max Load-Avg | 3150 | 3600 | 2850 | 3450 | 3410 | 3550 | 3770 | 3740 |
| Energy to max load -30 C | 3.1 | 24.5 | 31.2 | 30.0 | 31.5 | 13.4 | 18.8 | 32.1 |
| Energy to failure -30 C | 3.4 | 25.6 | 36.9 | 31.6 | 36.1 | 14.2 | 19.7 | 35.1 |
| Max Load -30 C | 1406 | 4102 | 4144 | 4355 | 4469 | 2960 | 3240 | 4610 |

TABLE 4-continued

| Property | | | | | | | | |
|---|---|---|---|---|---|---|---|---|
| Impact Strength Avg | 123 | 152 | 124 | 237 | 186 | 242 | 215 | 192 |
| Flexural Modulus Avg | 1430 | 1630 | 739 | 1490 | 1370 | 1150 | 1540 | 1580 |

| Property | 9 | 10* | 11* | 12* | 13 | 14 | 15 |
|---|---|---|---|---|---|---|---|
| Elongation at Yield-Avg/0 | 16 | 15 | 7 | 5 | 11 | 12 | 13 |
| Elongation at Break-Avg | 170 | 79 | 100 | 6 | 120 | 120 | 106 |
| Stress at Break-Avg | 40.0 | 36.0 | 38.3 | 26.3 | 39.0 | 41.1 | 43.1 |
| Stress at Yield-Avg | 40.5 | 35.1 | 44.2 | 26.8 | 39.9 | 44.3 | 47.0 |
| Modulus of Elasticity | 1427 | 1500 | 2480 | 1392 | 1880 | 1602 | 1658 |
| Deflection temp-Avg | 140 | 146 | 154 | 119 | 147 | 138 | 132 |
| Energy to failure-23 C Avg | 42.6 | 41.0 | 43.4 | 32.5 | 44.3 | 42.2 | 45.1 |
| Energy to max load-23 C Avg | 29.8 | 30.0 | 30.0 | 27.3 | 29.1 | 28.3 | 31.4 |
| Max Load-Avg | 3600 | 3510 | — | 3180 | 3570 | 3680 | 3990 |
| Energy to max load -30 C | 31.6 | 17.7 | 10.5 | 29.9 | 30.9 | 22.5 | 25.2 |
| Energy to failure -30 C | 35.5 | 18.7 | 11.4 | 34.4 | 36.3 | 25.4 | 28.1 |
| Max Load -30 C | 4490 | 3545 | 2531 | 4280 | 4486 | 25 | 4040 |
| Impact Strength Avg | 253 | 237 | 155 | 227 | 298 | 436 | 356 |
| Flexural Modulus Avg | 1250 | 1170 | 1620 | 1020 | 1370 | 1530 | 1590 |

*Comparative examples

Examples employing a combination of a block copolymer having a high alkenyl aromatic content with a block copolymer having a low alkenyl content demonstrate an impact strength that is markedly greater than the relevant comparative examples, in some cases more that double the impact strength.

Examples 16

Covered wires were produced using the composition of Example 15. The conductors had sizes of 0.2 square millimeters (mm$^2$), 0.5 mm$^2$, and 2 mm$^2$. The thermoplastic composition was filtered through a 325 mesh and dried at 82° C. for 3-4 hours prior to extrusion with the conductive core to form the covered wire. The color masterbatch was added separately to the extruder. The coverings had thicknesses of 0.2 millimeters (0.2 mm$^2$ conductive wire) or 0.4 millimeters (0.5 mm$^2$ and 2 mm$^2$ conductive wire).

The covered wires were tested for resistance to degradation by various automotive fluids such as gasoline, diesel fuel, engine oil, ethanol, power steering fluid, automatic transmission fluid, engine coolant, and battery acid. The covered wires were also tested for fire retardance and hot water resistance. Testing was performed in accordance with ISO 6722 and the covered wires passed the chemical resistance, flame retardance and hot water testing. The covered wires had a scrape abrasion resistance of 402 cycles. Testing was performed according to ISO 6722 using a 4 Newton load and a needle having a 0.45 millimeter diameter on a covered wire having a 0.2 mm$^2$ conductor. The covered wires also passed thermal overload testing for class C in accordance with ISO 6722. The covered wires passed short term heat aging testing when performed under the conditions for Class C according to ISO 6722.

While the invention has been described with reference to a several embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A thermoplastic composition comprising:
   poly(arylene ether) having an initial intrinsic viscosity greater than 0.25 dl/g as measured in chloroform at 25° C.;
   a polyolefin having a melt temperature greater than or equal to 120° C. and a melt flow rate of 0.3 to 15;
   a first block copolymer having a aryl alkylene content greater than or equal to 50 weight percent based on the total weight of the first block copolymer;
   a second block copolymer having an aryl alkylene content less than 50 weight percent based on the total weight of the second block copolymer; and
   a flame retardant selected from the group consisting of melamine, melamine cyanurate, melamine phosphate, melamine pyrophosphate, melamine polyphosphate, melam, melem, melon, zinc borate, boron phosphate, monoammonium phosphate, diammonium phosphate, alkyl phosphonates, metal dialkyl phosphinate, ammonium polyphosphates, low melting glasses and combinations of two or more of the foregoing flame retardants, wherein the poly(arylene ether) is present in an amount by weight greater than the amount of polyolefin by weight, and the composition comprises less than 0.1 weight percent polysiloxane.

2. The composition of claim 1 wherein the composition is essentially free of an alkenyl aromatic resin.

3. The composition of claim 1, wherein the thermoplastic composition comprises particles comprising the poly(arylene ether) dispersed in a matrix comprising the polyolefin and the particles have an average diameter less than 5 micrometers.

4. The composition of claim 1, wherein the thermoplastic composition comprises particles comprising the poly(arylene ether) dispersed in a matrix comprising the polyolefin and the poly(arylene ether) particles have an average particle area less than or equal to 4 square micrometers.

5. The composition of claim 1, wherein the composition has a flexural modulus of 800-1800 Megapascals as determined by ASTM D790-03 at a speed of 1.27 millimeters per minute and a thickness of 3.2 millimeters.

6. The composition of claim 1, wherein the poly(arylene ether) is substantially free of visible particulate impurities.

7. The composition of claim 1, wherein the poly(arylene ether) is substantially free of particulate impurities greater than about 15 micrometers.

8. The composition of claim 1, wherein the poly(arylene ether) is present in an amount of about 30 to about 65 weight percent, the polyolefin is present in an amount of 20 to 40 weight percent, and the block copolymer or combination of block copolymers is present in an amount of 2 to 20 weight percent, based on the combined weight of the poly(arylene ether), polyolefin, and block copolymer.

9. The composition of claim 1, wherein the polyolefin comprises a polypropylene homopolymer, a polypropylene copolymer or a combination of a polypropylene homopolymer and a polypropylene copolymer.

10. The composition of claim 1, wherein the first block copolymer, the second block copolymer or both the first and second block copolymer comprise a blend of diblock and triblock copolymers.

11. The composition of claim 1, wherein the first block copolymer has an aryl alkylene content of 15 weight percent to 40 weight percent, based on the total weight of the block copolymer and the second block copolymer has an aryl alkylene content of 55 weight percent to 70 weight percent, based on the total weight of the block copolymer.

12. The composition of claim 1 wherein the flame retardant is free of chlorine and bromine.

13. The composition of claim 1, wherein the composition comprises less than 0.05 weight percent polysiloxane.

14. A thermoplastic composition comprising:
poly(arylene ether) having an initial intrinsic viscosity greater than 0.25 dl/g as measured in chloroform at 25° C.;
a polyolefin having a melt temperature greater than or equal to 120° C. and a melt flow rate of 0.3 to 15;
a first block copolymer having a aryl alkylene content greater than or equal to 50 weight percent based on the total weight of the first block copolymer;
a second block copolymer having an aryl alkylene content less than 50 weight percent based on the total weight of the second block copolymer; and
a flame retardant selected from the group consisting of zinc borate, metal dialkyl phosphinate, and combinations of the foregoing flame retardants, wherein the poly(arylene ether) is present in an amount by weight greater than the amount of polyolefin by weight, and the composition comprises less than 0.1 weight percent polysiloxane.

15. A covered wire comprising:
a conductor; and
a covering comprising a thermoplastic composition and the thermoplastic composition comprises:
a poly(arylene ether) having an initial intrinsic viscosity greater than 0.25 dl/g as measured in chloroform at 25° C.;
a polypropylene having a melt temperature greater than or equal to 120° C. and a melt flow rate of 0.3 to 15;
a first block copolymer having an aryl alkylene content greater than or equal to 50 weight percent based on the total weight of the first block copolymer;
a second block copolymer having an aryl alkylene content less than 50 weight percent based on the total weight of the second block copolymer; and
a flame retardant selected from the group consisting of melamine, melamine cyanurate, melamine phosphate, melamine pyrophosphate, melamine polyphosphate, melam, melem, melon, zinc borate, boron phosphate, monoammonium phosphate, diammonium phosphate, alkyl phosphonates, metal dialkyl phosphinate, ammonium polyphosphates, low melting glasses and combinations of two or more of the foregoing flame retardants, wherein the poly(arylene ether) is present in an amount by weight greater than the amount by weight of polyolefin, the composition comprises less than 0.1 weight percent polysiloxane and the covered wire has sufficient flame retardance to meet or exceed the flame retardance requirement of ISO 6722 and
wherein the covering is disposed over the conductor.

16. The covered wire of claim 15 wherein the covered wire meets or exceeds the standards set forth in ISO 6722.

17. The covered wire of claim 15 wherein the covered wire meets or exceeds the heat aging standards for Class C as set forth in ISO 6722.

18. The covered wire of claim 15 wherein the covered wire meets or exceeds the heat aging standards for Class A and B as set forth in ISO 6722.

19. The covered wire of claim 15 wherein the conductor comprises a single strand or a plurality of strands.

20. The covered wire of claim 19 wherein the plurality of strands may be bundled, twisted, or braided to form a conductor.

21. The covered wire of claim 15 wherein the conductor has a cross sectional area of 0.10 square millimeters to 4.5 square millimeters and the covering has a thickness of 0.15 millimeters to 1.0 millimeters.

22. The covered wire of claim 15, wherein the thermoplastic composition comprises particles comprising the poly(arylene ether) dispersed in a matrix comprising the polyolefin and the particles have an average diameter less than 5 micrometers.

23. The covered wire claim 15, wherein the composition has a flexural modulus of 800-1800 Megapascals as determined by ASTM D790-03 at a speed of 1.27 millimeters per minute and a thickness of 3.2 millimeters.

24. The covered wire claim 15, wherein the poly(arylene ether) is present in an amount of about 30 to about 65 weight percent, the polyolefin is present in an amount of 20 to 40 weight percent, and the block copolymer or combination of block copolymers is present in an amount of 2 to 20 weight percent, based on the combined weight of the poly(arylene ether), polyolefin, and block copolymer.

25. The covered wire claim 15, wherein the polyolefin comprises a polypropylene homopolymer, a polypropylene copolymer or a combination of a polypropylene homopolymer and a polypropylene copolymer.

26. The covered wire of claim 15, wherein the first block copolymer, the second block copolymer or both the first and second block copolymer comprise a blend of diblock and triblock copolymers.

27. The covered wire of claim 15, wherein the first block copolymer has an aryl alkylene content of 15 weight percent to 40 weight percent, based on the total weight of the block copolymer and the second block copolymer has an aryl alkylene content of 55 weight percent to 70 weight percent, based on the total weight of the block copolymer.

28. The covered wire of claim 15, wherein the flame retardant is free of chlorine and bromine.

29. The covered wire of claim 15, wherein the composition comprises less than 0.05 weight percent polysiloxane.

30. A covered wire comprising:
a conductor; and
a covering comprising a thermoplastic composition and the thermoplastic composition comprises:
a poly(arylene ether) having an initial intrinsic viscosity greater than 0.25 dl/g as measured in chloroform at 25° C.;

a polypropylene having a melt temperature greater than or equal to 120° C. and a melt flow rate of 0.3 to 15;
a first block copolymer having an aryl alkylene content greater than or equal to 50 weight percent based on the total weight of the first block copolymer;
a second block copolymer having an aryl alkylene content less than 50 weight percent based on the total weight of the second block copolymer; and
a flame retardant selected from the group consisting of zinc borate, metal dialkyl phosphinate, ammonium and combinations of the foregoing flame retardants,
wherein the poly(arylene ether) is present in an amount by weight greater than the amount by weight of polyolefin, the composition comprises less than 0.1 weight percent polysiloxane and the covered wire has sufficient flame retardance to meet or exceed the flame retardance requirement of ISO 6722 and
wherein the covering is disposed over the conductor.

* * * * *